US010009660B2

(12) United States Patent
Kim et al.

(10) Patent No.: US 10,009,660 B2
(45) Date of Patent: *Jun. 26, 2018

(54) MEDIA CONTENT TRANSCEIVING METHOD AND TRANSCEIVING APPARATUS USING SAME

(71) Applicant: LG ELECTRONICS INC., Seoul (KR)

(72) Inventors: Kyungho Kim, Seoul (KR); Jinpil Kim, Seoul (KR); Hyeonjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/391,284

(22) Filed: Dec. 27, 2016

(65) Prior Publication Data

US 2017/0111706 A1    Apr. 20, 2017

Related U.S. Application Data

(63) Continuation of application No. 14/125,212, filed as application No. PCT/KR2012/004867 on Jun. 20, 2012, now Pat. No. 9,571,893.

(Continued)

(51) Int. Cl.
| | |
|---|---|
| *H04N 7/173* | (2011.01) |
| *H04N 21/61* | (2011.01) |
| *H04N 21/2343* | (2011.01) |
| *H04N 21/2365* | (2011.01) |
| *H04N 21/43* | (2011.01) |
| *H04N 21/442* | (2011.01) |
| *H04N 21/845* | (2011.01) |

(Continued)

(52) U.S. Cl.
CPC ..... *H04N 21/6175* (2013.01); *H04N 21/2365* (2013.01); *H04N 21/2381* (2013.01);
(Continued)

(58) Field of Classification Search
CPC ........... H04N 21/2365; H04N 21/2381; H04N 21/4307; H04N 21/44209; H04N 21/6125; H04N 21/6175; H04N 21/8456
See application file for complete search history.

(56) References Cited

U.S. PATENT DOCUMENTS

2002/0069218 A1    6/2002  Sull et al.
2005/0238316 A1   10/2005  Boyce et al.
(Continued)

FOREIGN PATENT DOCUMENTS

| CN | 1813474 A   | 8/2006 |
|----|-------------|--------|
| CN | 101517943 A | 8/2006 |

(Continued)

OTHER PUBLICATIONS

XP062177031—Information technology_MPEG systems technologies—Part 6: Dynamic adaptive streaming over HTTP: Jan. 28, 2011. pp. 1-80.

*Primary Examiner* — Joshua D Taylor
(74) *Attorney, Agent, or Firm* — Dentons US LLP

(57) ABSTRACT

The present invention relates to a method and apparatus for transceiving media content through the Internet. A media transmitting method according to one embodiment of the present invention transmits media content through the Internet, and comprises the steps of: configuring the media content with a plurality of representations; dividing each of the plurality of representations into a plurality of segments; dividing each of the plurality of segments into a plurality of sub-segments; generating a plurality of time reference values corresponding to each of the plurality of sub-segments; and transmitting any one of the representations, wherein the representation being transmitted comprises the plurality of time reference values. According to the one embodiment of the present invention, media content can be seamlessly played back due to switching a bit stream when the state of a network changes.

10 Claims, 15 Drawing Sheets

Related U.S. Application Data

(60) Provisional application No. 61/498,627, filed on Jun. 20, 2011, provisional application No. 61/499,651, filed on Jun. 21, 2011.

(51) Int. Cl.
*H04N 21/2381* (2011.01)
*H04N 21/2662* (2011.01)

(52) U.S. Cl.
CPC ... *H04N 21/23439* (2013.01); *H04N 21/2662* (2013.01); *H04N 21/4307* (2013.01); *H04N 21/44209* (2013.01); *H04N 21/6125* (2013.01); *H04N 21/8456* (2013.01)

(56) References Cited

U.S. PATENT DOCUMENTS

| | | |
|---|---|---|
| 2009/0168812 A1 | 7/2009 | Crookes et al. |
| 2011/0116772 A1 | 5/2011 | Kwon et al. |
| 2011/0119395 A1 | 5/2011 | Ha et al. |
| 2012/0246690 A1 | 9/2012 | Einarsson et al. |
| 2014/0115647 A1 | 4/2014 | Kim et al. |

FOREIGN PATENT DOCUMENTS

| | | |
|---|---|---|
| EP | 2723086 A2 | 4/2014 |
| KR | 10-2006-0099413 A | 9/2006 |
| KR | 10-2011-0053176 A | 5/2011 |
| KR | 10-2011-0053177 A | 5/2011 |
| KR | 10-2011-0053179 A | 5/2011 |
| KR | 10-1717555 B1 | 3/2017 |

FIG.8

```
Box Type: 'pcrb'
Container: File
Mandatory: No
Quantity: Zero or one
```

FIG.9

```
aligned(8) class MPEG2TSPCRInfoBox extends Box('pcrb',0) {
    unsigned int(32) subsegment_count;
    for(i=1; i<=subsegment_count; i++){
        unsigned int(42) pcr;
        unsigned int(6) pad=0;
    }
}
```

FIG.10

```
BOx Type: 'masi'
Container: File
Mandatory: No
Quantity: Zero or one
```

FIG.11

```
aligned(8) class MediaAuxiliaryInformationBox extends Box('masi',0) {
        unsigned int(32) FormatID;
        unsigned int(8)      Data;
}
```

MEDIA CONTENT TRANSCEIVING METHOD AND TRANSCEIVING APPARATUS USING SAME

This application is a Continuation Application of U.S. patent application Ser. No. 14/125,212 filed Dec. 10, 2013, which is a National Phase of PCT/KR2012/004867 filed Jun. 20, 2012, which claims benefit and priority to U.S. Provisional Application Nos. 61/498,627 filed Jun. 20, 2011 and 61/499,651 filed Jun. 21, 2011, which are hereby incorporated in their entirety by reference.

TECHNICAL FIELD

The present invention relates to a method and device for transceiving media content through internet.

BACKGROUND ART

Digital broadcasting such as current terrestrial broadcasting, cable broadcasting, or Digital Multimedia Broadcasting (DMB) mostly streams AV content by using MPEG-2 Transport Stream (TS).

Moreover, with recent fast growth of internet, multimedia service providing content by using an Internet Protocol (IP) network as a main transmission network is actively used and digital broadcasting such as stereo 3D video broadcasting, Ultra High Definition (UHD) broadcasting, multipoint 3D video broadcasting, and hologram broadcasting has evolved in the direction requiring larger transmission capacity than before.

However, MPEG-2 TS including a 188 byte fixed length packet may be inefficient to transmit content having a higher resolution than an existing HDTV by using an IP network.

DISCLOSURE OF THE INVENTION

Technical Problem

Embodiments provide a transceiving method and device for streaming media content efficiently according to a network state.

Technical Solution

In one embodiment, provided is a method of transmitting media content through an internet. the method includes: configuring the media content with a plurality of representations; dividing the representation into a plurality of segments; generating time reference values respectively corresponding to subsegments in the segment; and transmitting one of the representations.

In another embodiment, provided is a method of receiving media content through an internet. The method includes: receiving a first representation from among a plurality of representations including the media content; stopping the receiving of the first representations and receiving a second representation; and presenting the received representation, wherein the received representation is divided into a plurality of segments and received and subsegments included in the segment correspond to time reference values, respectively.

In further another embodiment, provided is a device of transmitting media content through an internet. The device includes: a media encoder configuring the media content with a plurality of representations; a segmenter dividing the representation into a plurality of segments; a time reference value generating unit generating time reference values respectively corresponding to subsegments included in the segment; and a transmitting unit transmitting one of the representations.

In further another embodiment, provided is a device of receiving media content through an internet. The device includes: a receiving unit receiving one of a first representation and a second representation including the media content, and stopping receiving the first representation when receiving the second representation; and a control unit presenting one of the first representation and the second representation, wherein the received representation is divided into a plurality of segments and received and subsegments included in the segment correspond to time reference values, respectively.

Advantageous Effects

According to an embodiment of the present invention, when a bit stream switches according to a change in a network state, media content may be played seamlessly.

BRIEF DESCRIPTION OF THE DRAWINGS

FIGS. 8 and 9 are views illustrating a configuration of an MPEG-2 TS PCR Information Box providing metadata on media content according to an embodiment of the present invention.

FIGS. 10 and 11 are views illustrating a configuration of a Media Auxiliary Information Box providing metadata on media content according to an embodiment of the present invention.

MODE FOR CARRYING OUT THE INVENTION

Figure 1:
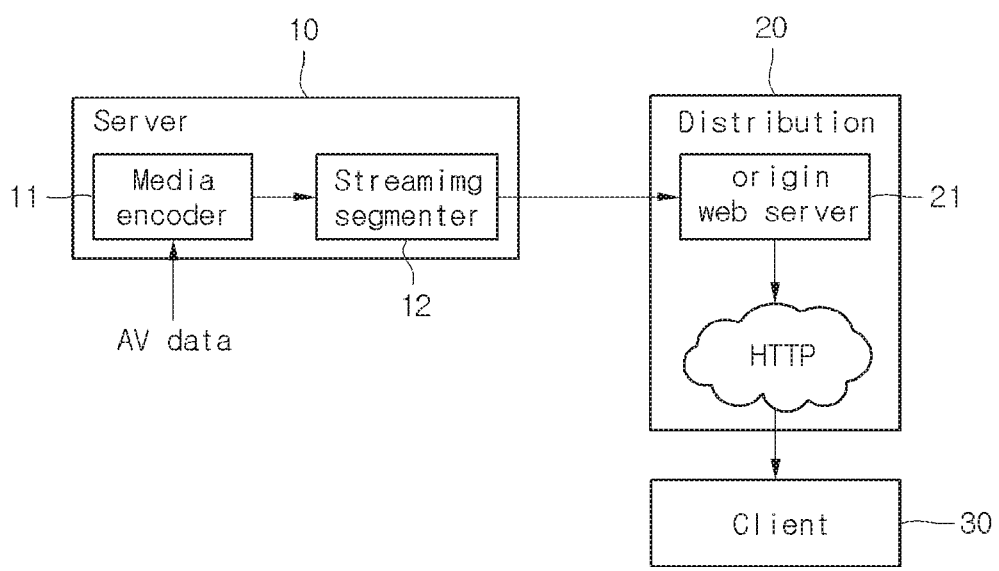
FIG. 1 is a block diagram illustrating a configuration of a media content transceiving system according to an embodiment of the present invention.

Hereinafter, a media content transceiving method and a transceiving device using the same according to an embodiment of the present invention will be described in more detail with reference to FIGS. 1 to 15.

In the following description, detailed descriptions of related well-known functions or configurations will be omitted if they would obscure the invention with unnecessary detail. Also, the terms used hereinafter are defined according to the functions of the present invention. Thus, the terms may vary depending on user's or operator's intentions or practices. Therefore, the terms used herein must be understood based on the descriptions made herein.

A transmitting device and a receiving device according to an embodiment of the present invention may transmit/receive media content by using an IP based transmission system, and for example, media content may be streamed by using the Transmission Control Protocol (TCP) and the Hypertext Transfer Protocol (HTTP) through a web server.

The transmitting device may receive content from a content provider and may convert the received content to transmit it, or may store and save the received content in a media DataBase (DB).

For example, a media content provided from a content provider may follow an MPEG-2 TS format or an ISO Base Media file format, and the transmitting device may convert the media content into a format easy for IP-based delivery and then may transmit the converted media content through a network such as an internet network or may store the converted media in the media DB.

Moreover, the receiving device may receive a media content from the transmitting device by using an IP based system and then may convert the received media content to play it or store it in a local storage.

For example, the receiving device may convert the received media content from the transmitting device into an MPEG-2 TS format or an ISO Base Media file format and then may process the converted media content to play it or store it in a local storage medium.

Moreover, since an IP based open internet environment using the HTTP does not guarantee QoS, a bandwidth through which data are transmitted to a receiving device is changed dynamically depending on network traffic, such that it may be difficult to obtain a stable and fixed bandwidth necessary for content file delivery.

For example, in a PC system that a user uses in a home, if software of frequent network transmission is installed or used, due to the increase in network traffic, a stable and fixed bandwidth may not be obtained and in order to resolve such an issue, a method of an internet gateway to allocate a bandwidth to specific software is devised but is not widely used.

Additionally, even when a fixed bandwidth is secured in a receiving device, since an internet server, that is, a transmitting device operating in an open internet environment, transmits service through several different networks, it may be still difficult to secure QoS.

For example, services such as Youtube are provided through another network that a specific service provider operates such that, as the amount in network setting or traffic is increased during a transmission process, content transmission may be delayed, content transmission may drop, or content may be retransmitted.

The above-mentioned QoS guarantee issue may be a main factor that makes content providers providing content service in an open internet environment feel difficult.

Moreover, in order to resolve the difficulty in the content transmission, an adaptive streaming method for appropriately transmitting/receiving content according to a network bandwidth by using a play list file in an M3U format may be used.

The adaptive streaming method creates content files having different bitrates with respect to one content and allows a request for a bitrate selection and transmission according to a bandwidth of a receiving device and since content is mostly transmitted using the HTTP protocol in an open internet environment, it is called HTTP Adaptive Streaming.

Hereinafter, a structure of a system for adaptive streaming will be described with reference to FIG. 1 according to an embodiment of the present invention.

FIG. 1 is a block diagram illustrating a configuration of a media content transceiving system according to an embodiment of the present invention.

Referring to FIG. 1, a system for adaptive streaming is configured including a server 10, a distribution 20, and a client 30.

When the server 10 delivers Audio/Video (AV) as raw data to a media encoder 11, the media encoder 11 may convert the AV data into a streaming File Format of an MPEG-2 TS form.

Moreover, a stream segmenter 12 may divide an MPEG-2 TS file outputted from the media encoder 11 into a plurality of segments.

For example, the streaming segmenter 12 may segment one file or a real-time MPEG-2 TS file into segments, each having a size for about 10 sec playback, and then may store the segments in the distribution 20.

The client 30 may request the segmented files stored in the distribution 20 by using the HTTP protocol and then may receive and play the files.

Additionally, the MPEG-2 TS file segments having different bitrates may be stored in the distribution 20, and for this, there may be several origin web servers 21 storing MPEG-2 TS file segments encoded with different specific bit rates in the distribution 20

For example, the MPEG-2 TS file segments encoded with a bitrate of 20 kbps and the MPEG-2 TS file segments encoded with a bitrate of 500 kbps may have different file names and may be stored in the distribution 20.

Accordingly, when a bandwidth in a reception area is decreased, the client 30 may request the file encoded with a bitrate of 20 kbps and then play it for 10 sec and also may check the bandwidth periodically again before 10 sec, that is, a playback time, elapse.

At this point, if the bandwidth is increased enough for transmitting a high quality file, the client 30 may request the transmission of a file encoded with a bitrate of 500 kbps.

As a result, the client 30 may alternately receive contents encoded with bitrates of 20 kbps and 500 kbps adaptively according to a network bandwidth and play them, and in the case of a poor bandwidth, the quality of an image may be deteriorated but an interrupted image may be minimized.

In order for the above-mentioned adaptive streaming using HTTP protocol, media content may be configured with a plurality of representations, and media content included in each of the representations may have different bitrates, resolutions, languages or codecs.

Media content may include media components such as audio, video, or timed text, and a representation may be a structured collection of one or more media components.

In this case, the client 30 may request one of a plurality of representations configured to have different bitrates, as mentioned above, from the server 20 and may receive it.

Moreover, in order for the client 30 to access segments and provide streaming service to a user, the server 10 may provide a Media Presentation Description (MPD) including metadata required by the client 30 in addition to segment data.

The client 30 may select one of a plurality of representations by using an element in the MPD and then may request transmission.

The representation is segmented into the above-mentioned plurality of segments and may be transmitted as a segment or a partial segment in response to a request of the client 30 by using an HTTP GET or HTTP partial GET method defined by HTTP 1.1 (RFC 2616).

On the other hand, if bitstream switching is available, the client 30 may switch the received representation with another representation on the basis of information updated during media playback.

In this case, the client 30 may receive and play a new representation from a time that a previous representation is played.

Additionally, a segment may be configured including a plurality of subsegments, and each subsegment may mean the smallest unit indexed in a segment level. The segment may include an Initialization Segment, a Media Segment, an Index Segment, and a Bitstream Switching Segment.

Figure 2:
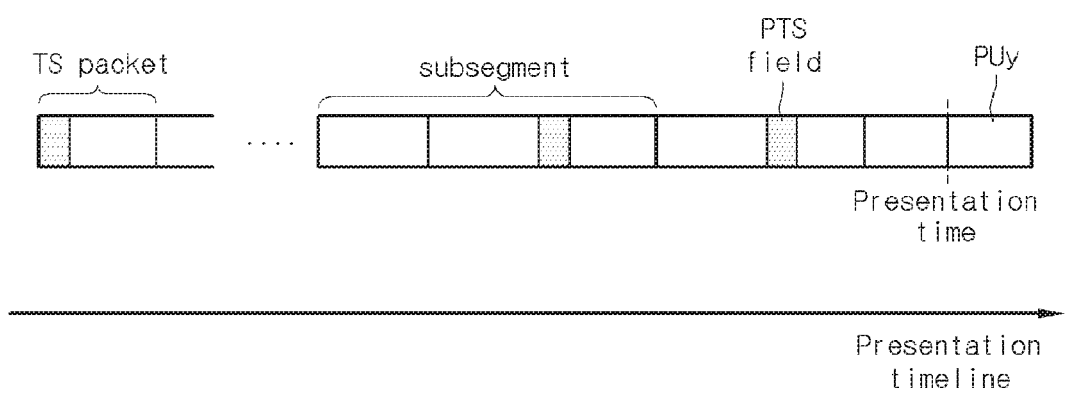
FIG. 2 is a view illustrating a structure of MPEG-2 TS.

FIG. 2 is a view illustrating a structure of MPEG-2 TS.

Referring to FIG. 2, each MPEG-2 TS may include a plurality of MPEG-2 TS packets having a fixed bitrate of 180 bytes and each subsegment may be configured with a set of sequential MPEG-2 TS packets.

For example, one sample is an access unit configured with at least one MPEG-2 TS packet having the same PID and a subsegment may be defined as one indexed set of access units sequential according to a decoding order.

Moreover, a fragmented file structure may be used to stream an ISO Base Media file format.

For example, the fragmented file divides media tracks into a plurality of fragments physically, and each fragment may be configured with a Movie Fragment (moof) box and a media data (mdat) box.

The mdat box following the moof box may include fragment media data and a pair of moof-mdat in such a combination may configure one fragment.

In this case, a subsegment may be defined as a self-contained set of at least one sequential movie fragment, and accordingly, may include at least one Movie Fragment (moof) box and at least one media data (mdat) box corresponding thereto.

According to an embodiment of the present invention, when a media content in the above-mentioned MPEG-2 TS or ISO base media file format is configured with a plurality of representations and transmitted by a segment unit, the server 10 may use a Program Clock Reference (PCR) to allow bit stream switching to be efficiently performed in the client 30. The PCR is information on a system clock in an MPEG-2 TS and may indicate a time reference value with respect to a program.

Moreover, although the case that a media content in the MPEG-2 TS or ISO base media file format is transmitted to the internet through HTTP is described exemplarily, the present invention is not limited thereto, and a media content transceiving method and device according to an embodiment of the present invention may be applicable to various formats of media contents.

Hereinafter, embodiments for a media content transmitting method including a PCR corresponding to a subsegment will be described with reference to FIGS. 3 to 7.

Figure 3:
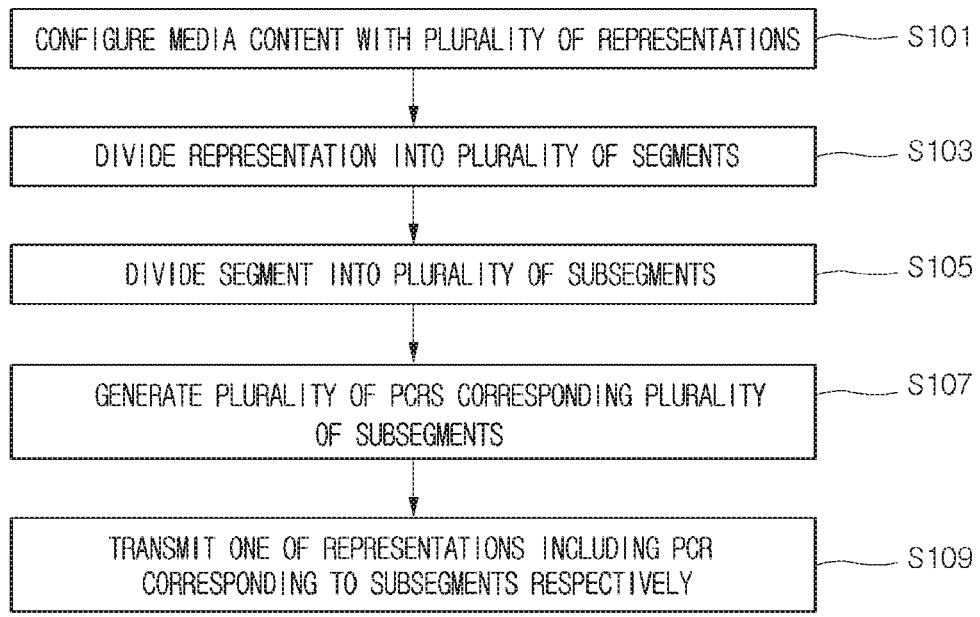
FIG. 3 is a flowchart illustrating a media content transmitting method according to an embodiment of the present invention.

FIG. 3 is a flowchart illustrating a media content transmitting method according to an embodiment of the present invention. Hereinafter, in relation to a transmitting method below, a description of the same content described with reference to FIGS. 1 and 2 is omitted.

Referring to FIG. 3, the transmitting device configures media content with a plurality of representations in operation S101. For example, the plurality of representations may be configured differently depending on at least one of a bitrate, resolution, and language, and codec of a media content.

The transmitting device divides each of the configured representations into a plurality of segments in operation S103. For example, each of the representations may be divided into a plurality of segments for transmission using the HTTP protocol.

The transmitting device divides each of a plurality of configured segments into a plurality of subsegments in operation S105. For example, each of the media segments may be indexed by a subsegment unit according to a segment index.

Figure 4:
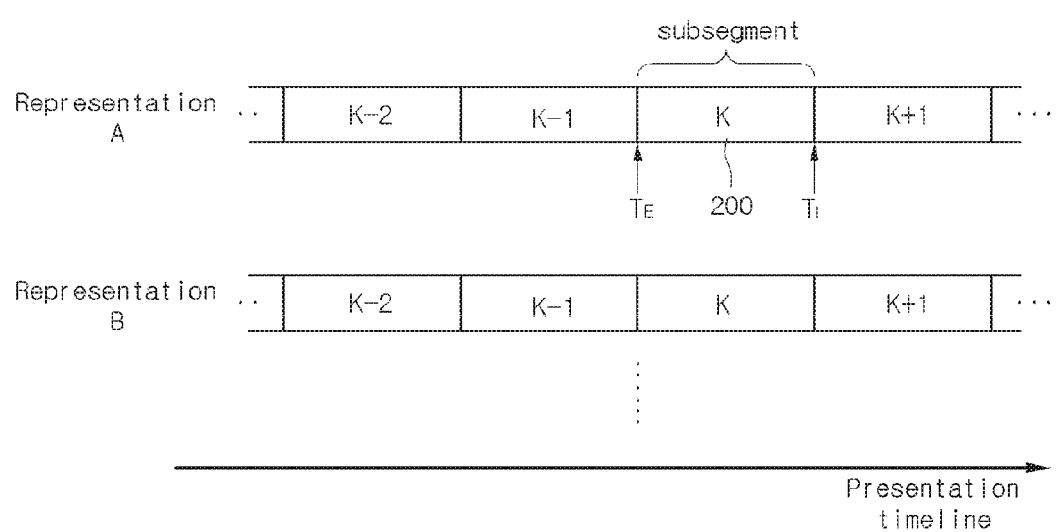
FIG. 4 is a view illustrating a configuration of representations including media content according to an embodiment of the present invention.

FIG. 4 is a view illustrating a configuration of representations including media content according to an embodiment of the present invention.

Referring to FIG. 4, the transmitting device may create a media content including a Representation A and a Representation B having different bitrates and the representations A and B may form one group. The group may further include other representations in addition to the representations A and B.

Moreover, there is index information on all subsegments included in the representations A and B and the index information may be used for the client 30 to randomly access subsegments of a segment by using the partial HTTP GET method.

For example, if each subsegment includes a segment index or there is an index segment providing an index for subsegment.

A method of providing index information on subsegments will be described in more detail with reference to FIGS. 8 to 11.

Additionally, in relation to a subsegment, the earliest presentation time TE and the latest presentation time TL of the subsegment 200 may be defined. Hereinafter, referring to FIG. 5, a configuration of a subsegment will be described according to an embodiment of the present invention.

Figure 5:
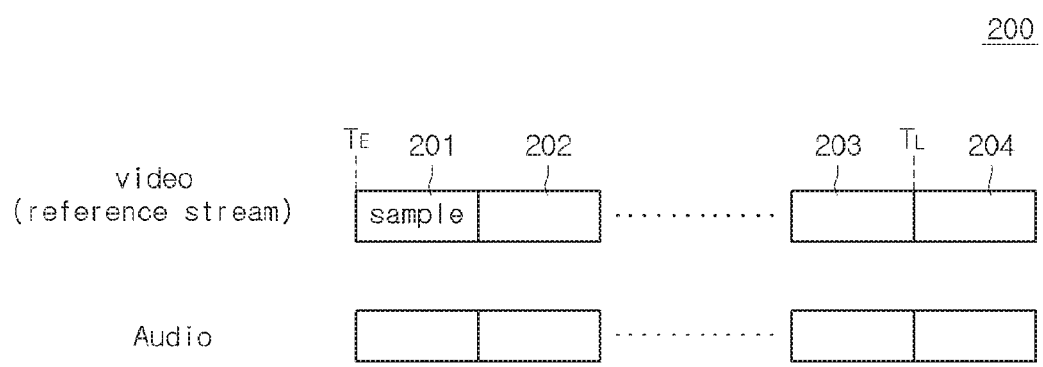
FIG. 5 is a view illustrating a configuration of a subsegment according to an embodiment of the present invention.

FIG. 5 is a view illustrating a configuration of a subsegment according to an embodiment of the present invention.

Referring to FIG. 5, the subsegment 200 may include two media components, for example, video and audio, and one of the media components, for example, video, may be designated as a reference stream.

That is, the reference stream may mean a group of sequential samples of a primary media component among the media components.

In this case, the earliest presentation time TE of the subsegment 200 may be defined as the earliest presentation time of an arbitrary sample in the reference stream and accordingly, may be a presentation time of the earliest sample 201 among video samples.

Also, the latest presentation time TL of the subsegment 200 may be a presentation time of the latest sample 204 in the reference stream.

Moreover, the sample 204 may mean an access unit in a stream of the subsegment 200 (or a segment).

Referring to FIG. 4 again, the subsegments shown in FIG. 4 may have different sizes or different durations of media content.

Additionally, although the latest presentation time TL of a subsegment positioned at the boundary between sequential subsegments is shown in FIG. 4, the latest presentation time TL of a subsegment may be slightly ahead of the boundary between subsegments.

That is, in the representation A, the latest presentation time TL of the kth subsegment may be slightly ahead of a time corresponding to the boundary between the kth subsegment and the K+1th subsegment.

Hereinafter, referring to FIG. 6, a presentation time of subsegments will be described.

Figure 6:
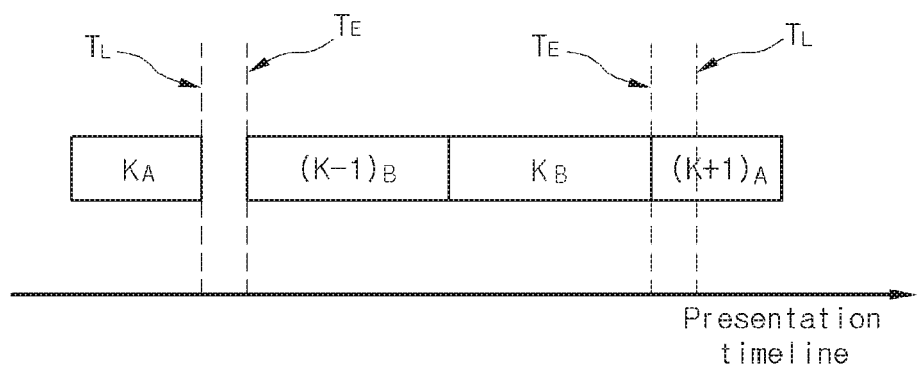
FIG. 6 is a view illustrating a presentation time of a subsegment.

FIG. 6 is a view illustrating a presentation time of a subsegment.

Referring to FIG. 6, the earliest presentation time TE of the K−1th subsegment (K−1)B of the representation B may be later than the latest presentation time TL of the Kth subsegment KA of the representation A.

If the bit stream switches from the representation A to the representation B, the client 30 may present the representation B after the switching while presenting the representation A.

At this point, after receiving the Kth subsegment KA of the representation A and completely presenting it, the client 30 receives the K−1th subsegment (K−1)B of the representation B and presents it, and a time that a subsegment is not presented on the basis of a presentation timeline occurs by the difference by the earliest presentation time TE of the K−1th subsegment (K−1)B of the representation B and the latest presentation time TL of the Kth subsegment KA of the representation A.

Additionally, the earliest presentation time TE of the K+1th subsegment (K+1)B of the representation A may be ahead of the latest presentation time TL of the Kth subsegment KB of the representation B.

If the bit stream switches from the representation B to the representation A, the client 30 may present the representation A after the switching while presenting the representation B.

At this point, since the client receives the subsegment (K+1)A of the representation B and presents it before receiving the Kth subsegment KB of the representation B and completely presenting it, a presentation time of a subsegment may overlap on the basis of a presentation timeline.

Accordingly, in order to prevent the case that a subsegment is not presented during a bit stream switching process or presentation times of subsegments of different representations overlap, the earliest presentation time TE of the Kth subsegment included in one of the representation A and the representation B needs to correspond to the latest presentation time TL of the K−1th subsegment included in the other representation.

Referring to FIG. 3 again, the transmitting device creates a plurality of PCRs corresponding to a plurality of subsegments in operation S107. The transmitting device may include the plurality of PCRs corresponding to the plurality of subsegments in an index segment. The transmitting device may allow bit stream switching to be smoother by transmitting a PCR.

Hereinafter, a method of using a PCR to allow the presentation times of two subsegments having different indices included in different respective representations to be mapped to a presentation timeline will be described with reference to FIG. 7.

Figure 7:
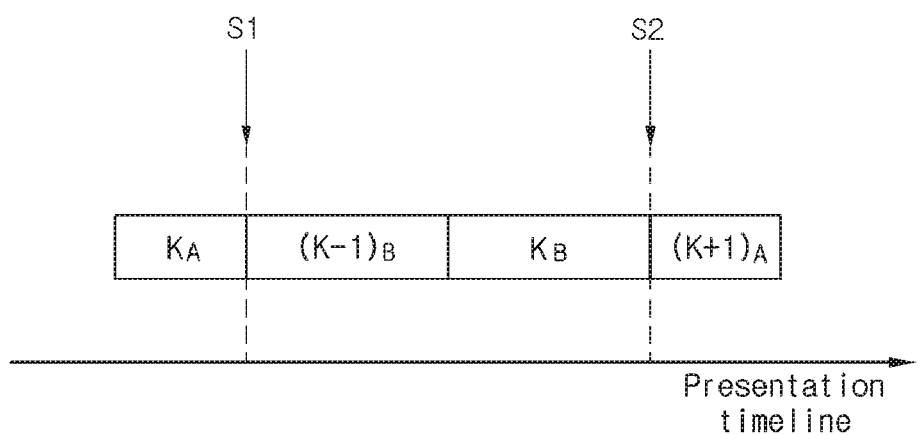
FIG. 7 is a view illustrating the presentation times of subsegments using a PCR.

FIG. 7 is a view illustrating the presentation times of subsegments using a PCR.

Referring to FIG. 7, the client 30 may switch the received representation with another representation on the basis of information updated during media playback. For example, the client 30 may receive the representation A including a media content encoded with a bitrate of 500 kbps and the representation B including a media content encoded with a bitrate of 20 kbps alternately.

The client 30 may receive the K−1 the subsegment (K−1)B of the representation B because a bit stream switches while receiving the Kth segment KA of the representation A.

The client 30 may extract a first PCR value of the Kth subsegment KA of the representation A and a second PCR value of the K−1th subsegment (K−1)B of the representation B while maintaining the presentation of the Kth subsegment KA of the representation A. Then, the client 30 may calculate a PCR difference value between the first PCR value and the second PCR value.

The client 30 may reflect the second PCR value and the PCR difference value to a first system clock S1 for the presentation of the K−1th subsegment (K−1)B of the representation B. By reflecting a PCR difference value of a subsegment in presentation and a subsegment expected to be presented to a system clock of the client 30, the presentation times of subsegments may correspond to each other based on a presentation time line.

As mentioned above, if the presentation times of two subsegments having different indices included in different representations respectively correspond to each other by using a PCR of a subsegment, even when the client 30 performs bit stream switching on representations having different bitrates, duplicate data may not be provided and data may not be damaged.

Referring to FIG. 3 again, the transmitting device transmits one of representations including a PCR corresponding to each of a plurality of subsegments in operation S109.

For example, the client 30 selects one of a plurality of representations having different bitrates, resolutions, languages, or codes of a media content by using an MPD provided from the server 10 and may request a segment or a partial segment corresponding to the selected representation by using an HTTP GET or HTTP partial GET method defined by HTTP 1.1 (RFC 2616).

Moreover, the MPD may include a bitstream switching flag indicating whether to switch a bit stream on representations and a subsegment alignment flag indicating whether to align subsegments.

If the bitstream switching flag in the MPD is 'true', the client 30 may perform the above bitstream switching operation.

Additionally, if the subsegment alignment flag in the MPD is 'true', subsegments are aligned as shown in FIGS. 9 to 11, and accordingly, the client 30 may switch a representation at the arbitrary boundary between sequential subsegments without duplicate or missing data.

According to an embodiment of the present invention, there is index information on all subsegments, and among a plurality or representations, since the earliest presentation time TE of the Kth subsegment included in an arbitrary first representation corresponds to the latest presentation time TL of the K−1th subsegment included in an arbitrary second representation, data loss or duplicate reception occurring during bitstream switching may be prevented.

Moreover, in order to divide MPEG-2 TS media into segments for transmission, a media may be roughly divided according to a duration of a reference program element (this may have the same meaning as a reference stream) as required by a transport protocol. A boundary between segments may be aligned with MPEG-2 TS packets.

In the metadata delivered for MPEG-2 TS media, one program element belonging to a program may be selected as a reference, and the earliest presentation time for Play Unit (PU) with respect to a reference program element in a segment may be delivered.

Additionally, with respect to each subsegment, a data offset and a stamp PTS for the earliest presentation time of a corresponding subsegment may be delivered, and the presentation time of a random access point and the information on whether PTS discontinuity occurs may be delivered selectively.

Moreover, the presentation time of a random access point and the information on whether PTS discontinuity occurs may be used in order to allow the client 30 to adjust a PTS-PCR based timeline to a media presentation timeline.

The metadata may be expressed in a binary format based on typical ISO Base Media file format data types, and this may have a similar structure to a 'sidx' box used in Dynamic adaptive streaming over HTTP (DASH).

In addition to a function of the 'sidx' box, a format of metadata according to an embodiment of the present invention may allow the client 30 to adjust an MPEG-2 PTS-PCR based timeline to a media presentation timeline.

This is done by delivering the earliest PTS of a Play Unit PU in a subsegment, and additionally, information on discontinuity in the MPEG-2 PTS timeline may be delivered.

Hereinafter, referring to FIGS. 8 and 9, PCR information included in an index segment according to an embodiment of the present invention will be described.

FIGS. 8 and 9 are views illustrating a configuration of an MPEG-2 TS PCR Information Box providing metadata on media content according to an embodiment of the present invention.

Referring to FIG. 8, the metadata on media content may be configured with a MPEG-2 TS PCR Information Box 'pcrb', and the MPEG-2 TS PCR Information Box 'pcrb' may provide PCR information for MPEG-2 TS.

The index segment may include indexing information of a media segment. The index segment may be an index segment for single media segment or an index segment for multiple media segment.

The index segment for single media segment may accurately index one media segment. Each index segment indexing one media segment may start from a Segment Type box 'styp'. In the segment type box 'styp', an index segment subsegment (isss), that is, a brand defined by an ISO based media file format, may be shown. In an 'isss' brand, a single index segment may index an MPEG-2 TS based media segment.

Each index segment indexing one media segment may include one or more segment index boxes and MPEG-2 TS PCR information boxes 'pcrb' in order to accurately index one media segment. The MPEG-2 TS PCR information boxes 'pcrb' may immediately follow a Segment Index box 'sidx' documenting the same subsegment.

The index segment for multiple media segment may index a multiple media segment. Each index segment indexing multiple media segment may start from a Segment Type box 'styp'. In the segment type box 'styp', an index segment media segment (isms), i.e., a brand defined by an ISO based media file format, may be shown. In an 'isms' bland, a representation index segment may index an MPEG-2 TS based media segment.

Each media segment may be indexed by one or more segment index boxes. A plurality of segment index boxes for one given media segment may be contiguous.

Indexing information for a plurality of media segments may be concatenated in the order expected by a single overall segment index box.

An overall segment index box may include one entry in a loop for each media segment. Each entry may indicate segment index information for a single media segment.

An index segment having a subsegment index may include an 'ssss' brand in the Segment Type box 'styp' as a compatible brand. In an 'ssss' brand, a subsegment index segment may index an MPEG-2 TS based media segment.

An index segment having a subsegment index may follow an index segment for a single media segment defined to '0' or may follow an index segment for a multiple media segment, but the present invention is not limited thereto. A Sub-segment Index box 'ssix' may immediately follow after the Segment Index box 'sidx' or may immediately follow before the MPEG-2 TS PCR 'pcrb'. The Segment Index box 'sidx' and the MPEG-2 TS PCR information box 'pcrb' may record the same subsegment. In such a way, the above segment index box 'sidx' may index only a plurality of subsegments.

Referring to the syntax structure of the MPEG-2 TS PCR information box 'pcrb' shown in FIG. 9, subsegment_count may specify the number of subsegments of which some information is specified to the MPEG-2 TS PCR information box 'pcrb' and may be a positive integer. subsegment_count may be identical to reference_count of a final segment index box. subsegment_count may be indexed in a loop and may be set to a value equal to or grater than 1.

pcr indicates an MPEG-2 TS PCR corresponding to the first sync byte of the first MPEG-2 TS packet included in a media subsegment.

Hereinafter, referring to FIGS. 10 and 11, PCR information included in an index segment according to another embodiment of the present invention will be described.

FIGS. 10 and 11 are views illustrating a configuration of a Media Auxiliary Information Box providing metadata on media content according to an embodiment of the present invention.

Referring to FIG. 10, the metadata on media content may be configured with a Media Auxiliary Information Box 'masi'. The Media Auxiliary Information Box 'masi' may include auxiliary media information. The Media Auxiliary Information Box 'masi' may include information that a segment or a subsegment configuring a segment means a media type called an MPEG-2 TS 'm2ts'.

The index segment, as mentioned above, may be an index segment for single media segment or an index segment for multiple media segment but the present invention is not limited thereto.

The index segment for single media segment may accurately index one media segment. Each index segment indexing one media segment may start from a Segment Type box 'styp'. In the segment type box 'styp', the brand 'isss' may be shown.

Each index segment indexing one media segment may include one or more segment index boxes and Media Auxiliary Information Boxes 'masi' in order to accurately index one media segment.

Referring to the syntax structure of the Media Auxiliary Information Box 'masi' shown in FIG. 11, FormatID may be a unique identifier for data. FormatID may include four characters. Data may mean media data and the present invention is not limited thereto.

Referring to FIG. 10 again, the Media Auxiliary Information Box 'masi' may immediately follow the Segment Index box 'sidx' documenting the same subsegment. FormatID of the Media Auxiliary Information Box 'masi' may be set to 'm2ts'. The preceding 42 bits of the data field of the Media Auxiliary Information Box 'masi' may include an MPEG-2 TS PCR. The MPEG-2 TS PCR may correspond to the first MPEG-2 TS packet at an offset that the first offset first_offset indicates when a frequency is 27 MHz. A value of the next 6 bits of the data field of the Media Auxiliary Information Box 'masi' may be left as 0.

The index segment for multiple media segment may index a multiple media segment. Each index segment indexing multiple media segment may start from a Segment Type box 'styp'. In the segment type box 'styp', 'isms', i.e., a brand defined by an ISO based media file format, may be shown.

Each media segment may be indexed by one or more segment index boxes. A plurality of segment index boxes for one given media segment may be contiguous.

Indexing information for a plurality of media segments may be concatenated in the order expected by a single overall segment index box.

An overall segment index box may include one entry in a loop for each media segment. Each entry may indicate segment index information for a single media segment.

An index segment having a subsegment index may include an 'ssss' brand in the Segment Type box 'styp' as a compatible brand.

An index segment having a subsegment index may follow an index segment for a single media segment defined to '0' or may follow an index segment for a multiple media segment, but the present invention is not limited thereto. The Sub-segment Index box 'ssix' may immediately follow after the Segment Index box 'sidx' or may immediately follow before the Media Auxiliary Information Box 'masi'. The Segment Index box 'sidx' and the Media Auxiliary Information Box 'masi' may record the same subsegment. In such a way, the above segment index box 'sidx' may index only a plurality of subsegments.

Hereinafter, referring to FIGS. 12 and 13, a media content receiving method and device will be described according to an embodiment of the present invention.

The receiving device 300 according to an embodiment of the present invention may perform an operation of the client 300 as described with reference to FIGS. 1 to 11.

Additionally, since a configuration of a media content that the receiving device 300 receives, for example, a configuration of a representation, a segment, and a subsegment, may be the same such as that described with reference to FIGS. 3 to 7, its detailed description will be omitted below.

Figure 12:
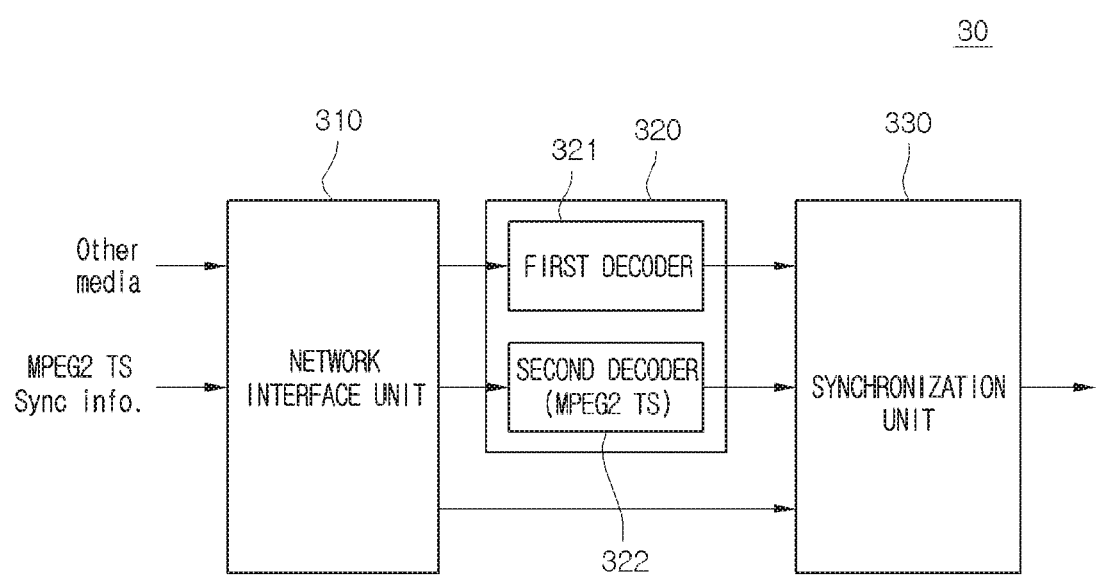
FIG. 12 is a block diagram illustrating a media content receiving device according to an embodiment of the present invention.

FIG. 12 is a block diagram illustrating a media content receiving device according to an embodiment of the present invention.

Referring to FIG. 12, the receiving device 300 includes a receiving unit and a control unit. The receiving unit includes an interface unit 310 and the control unit includes a decoding unit 320 and a synchronization unit 330.

A network interface unit 310, for example, an HTTP interface, may receive a media file together with synchronization information. For example, the network interface unit 310 may receive synchronization information Sync Info. having the above-mentioned configuration by referencing FIGS. 6 to 11 together with an MPEG-2 TS, and may receive other media in a different format such as a 3GPP file format.

The decoding unit 320 may decode and output the media file that the network interface unit 310 receives. The decoding unit 320 includes a first decoder 321 for decoding other media received through the network interface unit 310 and a second decoder 322 for decoding an MPEG-2 TS, but the present invention is not limited thereto. The first decoder may be a decoder for decoding media in different formats such as a 3GPP file format or may be an MPEG-2 TS decoder identical to the second decoder 322. The second decoder 322 may be a typical MPEG-2 TS decoder. The second decoder 322 may receive an MPEG-2 TS from the network interface unit 310 and decode it, and then may output the decoded Play Units and their PTSs.

The synchronization unit 330 may synchronize a media file the decoding unit 320 decodes with a media presentation timeline by using a media presentation time included in the synchronization information that the network interface unit 310 receives.

Moreover, the synchronization unit 330 may identify a Play Unit including a media presentation time provided through the received synchronization information. For this, the network interface unit 310 may recover the PTSs of Play Units having a provided presentation time and deliver them to the synchronization unit 330 or the PTS of a corresponding Play Unit needs to be provided from the transmitting device together with a presentation time. In order to recover a PTS, elementary stream time recovery may be used.

The synchronization unit 330 may synchronize MPEG 2 TS based media outputted from the second decoder 322 with other media outputted from the first decoder 321 by using the decoding information (for example, media presentation times for Play Units) delivered from the transmitting device.

Moreover, the receiving device 300 may present the MPEG-2 TS based media synchronized by the synchronization unit 330 together with other media.

Figure 13:
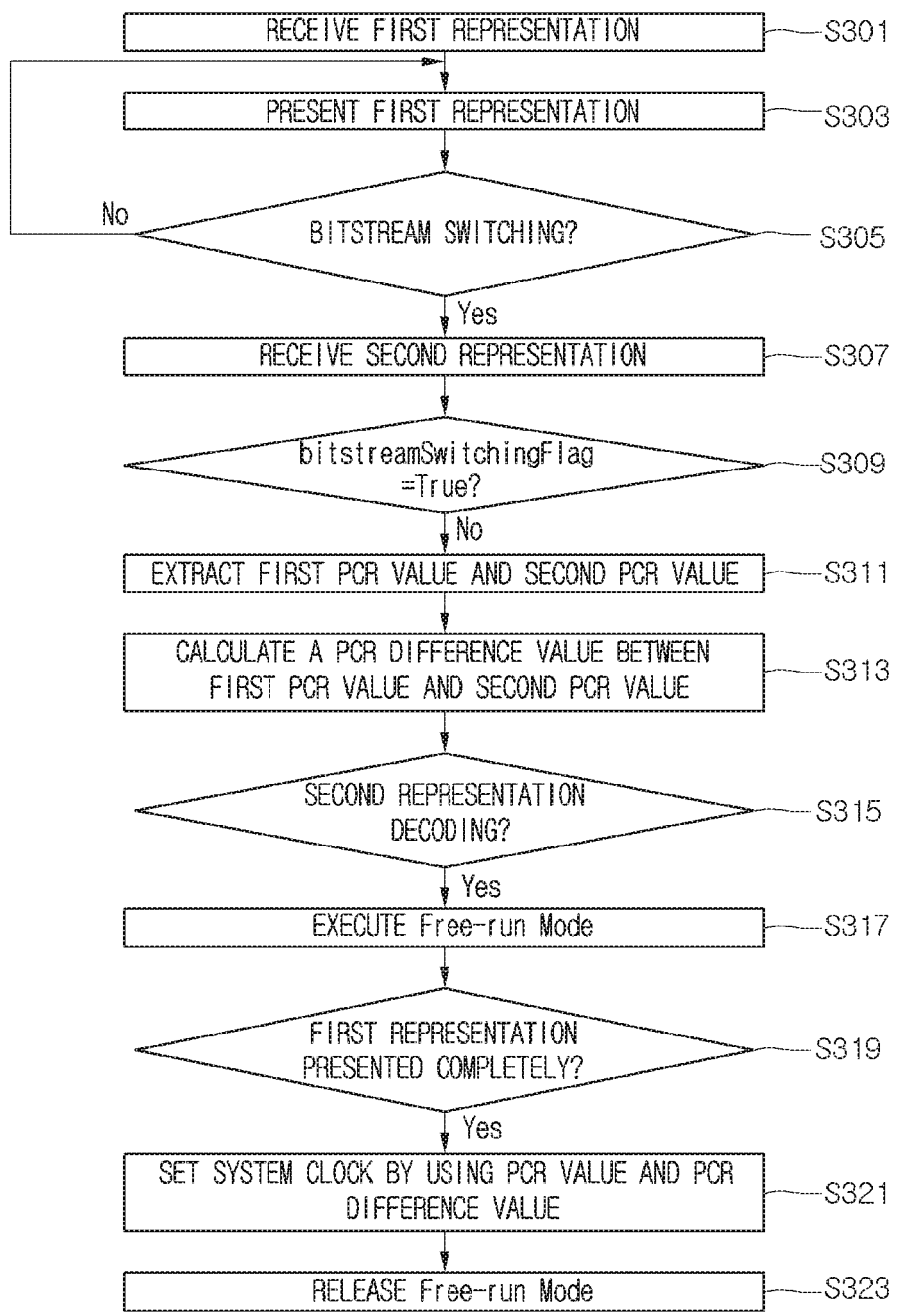
FIG. 13 is a flowchart illustrating a media content receiving method according to an embodiment of the present invention.

FIG. 13 is a flowchart illustrating a media content receiving method according to an embodiment of the present invention. Hereinafter, in relation to a receiving method below shown in FIG. 13, a description of the same content described with reference to FIGS. 1 and 12 is omitted.

Referring to FIG. 13, the receiving device 300 receives a first representation in operation S301 and presents the received first representation in operation S303.

For example, the receiving unit (not shown) equipped in the network interface unit 310 of the transmitting device 300 may request a segment or a partial segment from the transmitting device through an HTTP GET or HTTP partial GET method defined by HTTP 1.1 (RFC 2616).

The network interface unit 310 may select one of a plurality of representations having different bitrates, resolutions, languages, or codecs of a media content as a representation to be received by using an MPD received from the transmitting device The network interface unit 310 determines whether bitstream switching is required during the presentation of a first representation in operation S305.

When bitstream switching is required for the second representation, the network interface unit 310 receives the second representation in operation S307.

The receiving device determines whether a bitstream switching flag bitstreamSwitchingFlag is 'True' by using an MPD provided from the server 10 in operation S309.

If the bitstream switching flag bitstreamSwitchingFlag is 'True', the receiving device may omit the step described below. Because, when the bitstream switching flag bitstreamSwitchingFlag is 'True', two segments having different bitrates may be contiguous in an effective TS.

When the bitstream switching flag bitstreamSwitchingFlag is 'False', the receiving device extracts a first PCR value from an index segment of a first representation in presentation and then extracts a second PCR value from an index segment of a received second representation after bitstream switching in operation S311. The index segment may include a PCR as described with FIGS. 8 to 11. The receiving device may extract each PCR of a plurality of subsegments included in a representation from the index segment.

The receiving device calculates a PCR difference value between the first PCR value and the second PCR value in operation S313. The PCR difference value is a value obtained by jumping a PCR between a plurality of segments of two representations having different bitrates and a plurality of subsegments.

Here, the first PCR value may be a PCR value corresponding to the last MPEG-2 TS packet of a segment included in the first representation. Also, the second PCR value may be a PCR value corresponding to the first MPEG-2 TS packet of a segment included in the second representation.

In such a way, the receiving device may perform a partial additional MPEG-2 TS decoding operation to recover first and second PCR values from a media segment without the support of other devices.

The decoding unit 320 determines whether the second representation received in operation S307 is decoded in operation S315.

When a second representation is supplied to the decoding unit 320, the decoding unit 320 executes a Free-run mode in operation S317. Once the Free-run mode is executed, the receiving device may prevent flushing of buffers of the first representation during presentation.

The receiving device determines whether the presentation of the first representation is completed in operation S319.

When the presentation of the first representation is completed, the receiving device set a system clock by using the PCR difference value calculated in operation S313 and the second PCR value of the second representation in operation S321. The receiving device sets its system clock to a value obtained by adding the PCR difference value and the second PCR value, so that bitstream switching occurs, the first representation and the second representation may be presented seamlessly.

When the system clock is set to a new value, the decoding unit 320 releases the Free-fun mode in operation S323.

The media content receiving and processing method described with reference to FIGS. 1 to 13 may be performed by an IPTV receiver according to an embodiment of the present invention.

Hereinafter, referring to FIGS. 14 and 15, a configuration of an IPTV receiver according to an embodiment of the present invention will be described in more detail.

Figure 14:
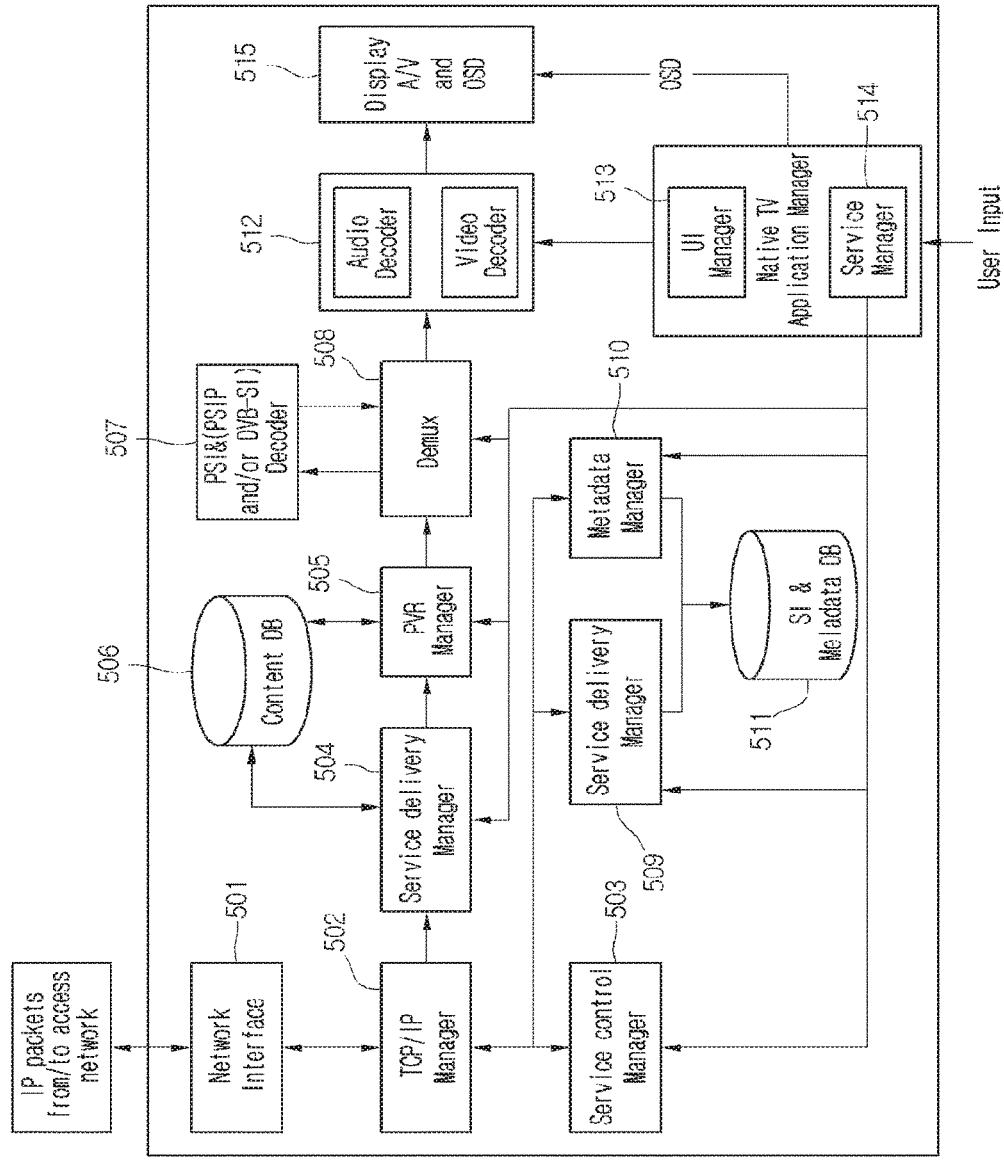
FIG. 14 is a block diagram illustrating a configuration of an IPTV receiver according to an embodiment of the present invention.

FIG. 14 is a block diagram illustrating a configuration of an IPTV receiver according to an embodiment of the present invention.

The IPTV receiver according to an embodiment of the present invention may include an additional tuner to receive terrestrial broadcasting, cable broadcasting, and satellite broadcasting. However, for convenience of description, in the present invention, a configuration receiving an IPTV provided using an IP network will be mainly described.

Moreover, an ITF represents an Open IPTV Terminal Function and may mean a receiver configured with a function module necessary for supporting IPTV service.

Referring to FIG. 14, the IPTV receiver includes a Network Interface 501, a TCP/IP Manager 502, a Service Delivery Manager 504, a PVR Manager 505, a Demux 508, a Data Decoder 507, an Audio/Video Decoder 512, an A/V Display & OSD Module 515, Application Managers 513 and 514, an SI & Metadata DB 511, a Service Discovery Manager 509, a Service Control Manager 503, a Metadata Manager 510, and a Content DB 506.

The network interface unit 501 receives packets received from a network and transmits packets to the network. That is, the network interface unit 501 may receive service and media content from a service provider through a network.

The TCP/IP manager 501 is involved in packet delivery from a source to a destination with respect to a packet received by the IPTV receiver and a packet transmitted from the IPTV receiver. Additionally, the TCP/IP manager 502 may classify the received packet to correspond to an appropriate protocol, and may output the classified packet to the Service delivery Manger 504, the Service delivery Manager 509, the Service control Manager 503, and the Metadata Manager 510.

The Service delivery Manager 504 is responsible for a control of the received service data. For example, in the case of controlling realtime streaming data, an RTP/RTCP may be used.

When realtime streaming data are transmitted using an RTP, the Service delivery Manager 504 parses the received data packet according to an RTP to transmit it to the Demux 508 or store it in the Content DB 506 according to a control of the service manager 514. Additionally, the Service delivery Manager 504 may feed back network reception information to a service side providing service by using an RTCP.

The Demux 508 demultiplexes the received packet into audio, video, and Program Specific Information (PSI) data and then transmits them to the audio/vide decoder 512 and the data decoder 507.

The data decoder 507 decodes service information such as Program Specific Information (PSI), for example. That is, the data decoder 507 may receive and decode a PSI section, a Program and Service Information Protocol (PSIP) section, or a DVB-Service Information (SI) section, which are demultiplexed by the Demux 508.

Additionally, the data decoder 507 creates a database on service information by decoding the received sections, and stores the data on service information in the SI & Metadata DB 511.

The audio/video decoder 512 decodes the video data and audio data received from the Demux 508. The audio/video decoder 512 may provide the decoded audio data and video data to a user through the display unit 515.

The application manager manages an overall state of the IPTV receiver and provides a user interface and also manages another manager. For this, the application manager includes a User Interface Manager 513 and a Service Manager 514.

The user interface manager 513 provides a Graphic User Interface (GUI) for user by using On Screen Display (OSD) and performs a receiver operation according to an input by receiving a key input from a user. For example, when a key input on a channel selection is received from a user, a key input signal may be transmitted to the service manager 514.

The Service Manager 514 controls a service related manager such as the Service delivery Manger 504, the Service Discovery Manager 509, the Service control Manager 503, and the Metadata Manager 510.

Additionally, the Service Manager 514 creates a channel map and selects a channel by using the channel map according to a key input received from the UI manager 513. Also, the Service Manager 514 receives service information of a channel from the data decoder 507 and sets audio/video Packet Identifier (PID) of the selected channel to the Demux 508.

The Service discovery Manager 509 provides information necessary for selecting a service provider providing service. Upon receiving a channel selection from the Service Manager 514, the Service discovery Manager 509 may find a service by using information necessary for selecting a service provider.

The Service control Manager 503 is responsible for service selection and control. For example, when a user select Live Broadcasting service such as an existing broadcasting system, the Service control Manager 503 uses an IGMP or an RTSP, and when a user selects a service such as Video On Demand (VOD), the Service control Manager 503 uses an RTSP, so that it controls service selection and control.

The RTSP protocol provides a trick mode on realtime streaming. Additionally, the Service control Manager 503 initializes and manages a session through an IMC gateway by using an IP Multimedia Subsystem (TMS) and a Session Initiation Protocol (SIP). The protocols are just one embodiment and other protocols may be used according to an implementation.

The Metadata Manager 510 manages service related metadata and stores metadata in the SI & Metadata DB 511.

The SI & Metadata DB 511 stores service information decoded by the data decoder 507, metadata managed by the Metadata Manager 510, and information necessary for selecting a service provider provided by the Service discovery Manager 509. Additionally, the ST & Metadata DB 511 may store setup data for system.

The SI & Metadata DB 511 and the Content DB 506 may be realized by using NonVolatile RAM (NVRAM) or flash memory and may be realized as logically separated two areas on the same storage area.

The PVR Manager 505, as a module for recording and presenting live streaming content, collects metadata on recorded content and generate enhanced information provided to a user, for example, a thumbnail image or an index.

A function of a control unit of an IPTV receiver according to an embodiment of the present invention may be realized through a plurality of divided modules, for example, the TCP/IP Manager 502, the Service Delivery Manager 504, the PVR Manager 505, the Application Managers 513 and 514, the Service Discovery Manager 509, the Service Control Manager 503, and the Metadata Manager 510.

For example, the TCP/IP Manager 502 may allow the Network Interface 501 to request only a payload or segment corresponding to a specific package (for example, a package that the IPTV receiver subscribes) from a server and receive it by filtering SD&S information through the above-mentioned target package information.

Moreover, the TCP/IP manager 502, by filtering SD&S information received in a multicast method through target package information, allows only a payload or segment corresponding to a specific package to be parsed and processed by the Data decoder 507.

Figure 15:
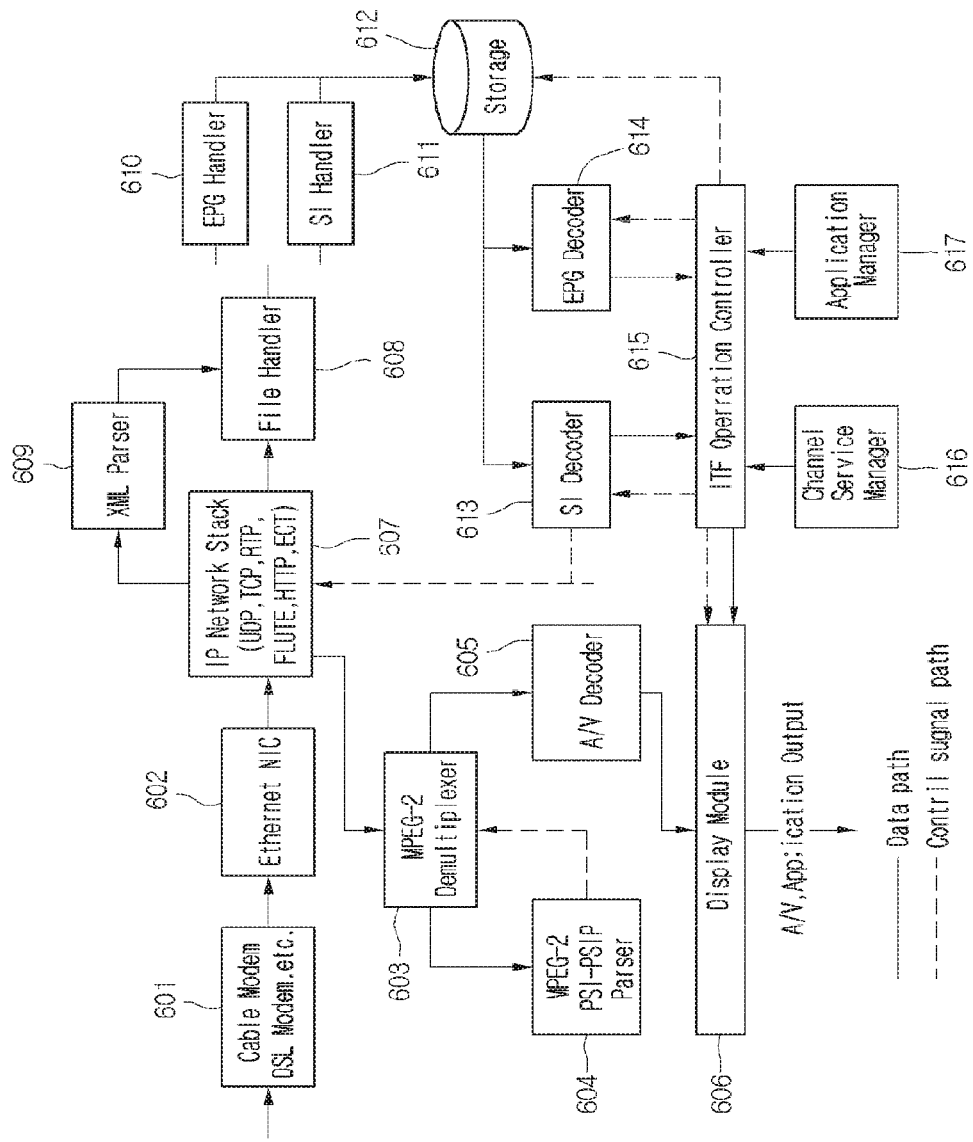
FIG. 15 is a block diagram illustrating a configuration of an IPTV receiver according to another embodiment of the present invention.

FIG. 15 is a block diagram illustrating a configuration of an IPTV receiver according to another embodiment of the present invention. A solid arrow shown in FIG. 15 corresponds to a data path and a dotted arrow corresponds to a control signal path.

A Cable modem, DSL modem, etc 601, as an interface for allowing an ITF to connect to an IP Network in a physical level, restores a digital signal by demodulating a signal transmitted through a physical medium.

An Ethernet NIC 602 restores a signal received through a physical interface to IP data, and the IP Network Stack 607 processes each layer according to an IP Protocol stack.

Moreover, an XML Parser 609 parses XML Document among the received IP data, and a File Handler 608 processes data transmitted in a file format through FLUTE among the received IP data.

An SI Handler 611 processes a portion corresponding to IPTV service information among data received in a File format and stores the processed portion in the storage 612 and an EPG Handler 610 processes a portion corresponding to IPTV EPG information among data received in a File format and stores the processed portion in the Storage 612.

The Storage 612 stores various data such as SI and EPG.

An SI Decoder 613 receives SI data from the Storage 612 and analyses them to obtain channel map information, and an EPG Decoder 614 analyzes EPG data stored in the Storage 612 to restore information necessary for EPG configuration.

An ITF Operation Controller 615 is a main controller controlling an operation of an ITF such as channel change or EPG display.

A Channel Service Manager 611 performs an operation such as channel change according to a user input, and an Application Manager 617 may perform application service such as EPG Display according to a user input.

An MPEG 2 Demultiplexer 603 extracts MPEG 2 TS data from received IP Datagram and delivers it to a corresponding module according to packet identification information PID.

Additionally, an MPEG-2 PSI/PSIP Parser 604 may extract PSI/PSIP data including packet identification information PID of A/V data or access information on a program element from an MPEG-2 TS and then may parse them.

Moreover, an A/V Decoder 605 may decode inputted Audio and Video data to deliver them to a Display module 606, and the Display module 606 may output the decoded A/V data or application.

Examples of the computer readable recording medium include read-only memory (ROM), random-access memory (RAM), CD-ROMs, magnetic tapes, floppy disks, and optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. A method for receiving media content, comprising: receiving, by a network interface unit, the media content including a representation which includes an index segment and a plurality of media segments, wherein each media segment is divided into a plurality of subsegments and the index segment includes an overall segment index box and a plurality of segment index boxes, and wherein each segment index box documents the plurality of subsegments; decoding, by a decoder, the media segments; and synchronizing, by a synchronization unit, the decoded media segments, wherein the overall segment index box includes one entry in a loop for each media segment and each entry indicates segment index information for a single media segment, wherein each segment index box is followed by a PCR information box which documents the plurality of subsegments, and wherein the PCR information box includes a loop for the plurality of subsegments, and the loop in the PCR information box includes PCR information and zero-padding bits corresponding to each subsegment, wherein playing the media segments based on the PCR information comprises: mapping a presentation time of the media segments to a media presentation timeline based on the PCR information; and playing the media segments based on the PCR information.

2. The method of claim 1, wherein the PCR information box comprises a PCR value corresponding to a sync byte of a foremost MPEG-2 TS packet contained in each of the plurality of subsegments.

3. The method of claim 1, wherein the PCR information box comprises a subsegment count field which represents a number of subsegments indexed by the segment index box.

4. The method of claim 1, further comprising:
extracting a subsegment index box from the index segment,
wherein the segment index box is followed by the subsegment index box.

5. The method of claim 1, wherein the mapping a presentation time of the media content to a media presentation timeline by using the PCR information comprises:
mapping a presentation time of the media content to a media presentation timeline by using the PCR difference between a first subsegment and a second subsegment,
wherein the first segment contains the first subsegment and the second subsegment.

6. An apparatus for receiving media content through internet, comprising:
a network interface unit for receiving the media content including a representation which includes an index segment and a plurality of media segments,
wherein each media segment is divided into a plurality of subsegments and the index segment includes an overall segment index box and a plurality of segment index boxes, and wherein each segment index box documents the plurality of subsegments;
a decoder for decoding the media segments; and
a synchronization unit for synchronizing the decoded media segments,
wherein the overall segment index box includes one entry in a loop for each media segment and each entry indicates segment index information for a single media segment,
wherein each segment index box is followed by a PCR information box which documents the plurality of subsegments, and
wherein the PCR information box includes a loop for the plurality of subsegments, and the loop in the PCR information box includes PCR information and zero-padding bits corresponding to each subsegment, wherein playing the media segments based on the PCR information comprises: mapping a presentation time of the media segments to a media presentation timeline based on the PCR information; and playing the media segments based on the PCR information.

7. The apparatus of claim 6, wherein the PCR information box comprises a PCR value corresponding to a sync byte of a foremost MPEG-2 TS packet contained in each of the plurality of subsegments.

8. The apparatus of claim 6, wherein the PCR information box comprises a subsegment count field which represents a number of subsegments indexed by the segment index box.

9. The apparatus of claim 6, wherein the control unit extracts a subsegment index box from the index segment,
wherein the segment index box is followed by the subsegment index box.

10. The apparatus of claim 6, wherein the playing the media content by using the PCR information comprises:
mapping a presentation time of the media content to a media presentation timeline by using the PCR difference between a first subsegment and a second subsegment,
wherein the first segment contains the first subsegment and the second subsegment.

* * * * *